Sept. 13, 1938.  N. M. LONEY  2,129,950

LOADING AUTOMOBILE BODIES FOR SHIPMENT

Filed July 11, 1936  2 Sheets-Sheet 1

Inventor
Neil M. Loney
By Blackmore, Spencer & Flint
Attorneys

Patented Sept. 13, 1938

2,129,950

UNITED STATES PATENT OFFICE 2,129,950

LOADING AUTOMOBILE BODIES FOR SHIPMENT

Neil M. Loney, Huntington Woods, Mich., assignor to General Motors Corp., Detroit, Mich., a corporation of Delaware Application July 11, 1936, Serial No. 90,210

9 Claims. (Cl. 105—368)

In the automobile industry, final assembly lines are usually located at some distance from the body plant and fabricated bodies must be hauled for whatever the distance may be. The present invention concerns improved structure for the easy and rapid handling and the compact loading of a number of assembled bodies in a transporting carrier. It involves broadly, the mounting of a pair of bodies back to back upon a vertical frame which is then moved by a dolly into the carrier for loading in succession with other similar body carrying frames upon top and bottom tracks. The invention may be applied to any of the several forms of transportation agencies but is intended primarily for rail and road vehicles. Also it is adapted for shipping articles other than automobile bodies.

Figure 1:
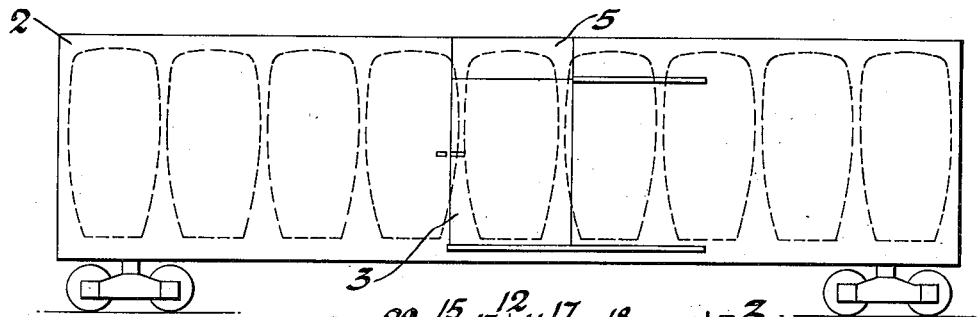
Figure 2:
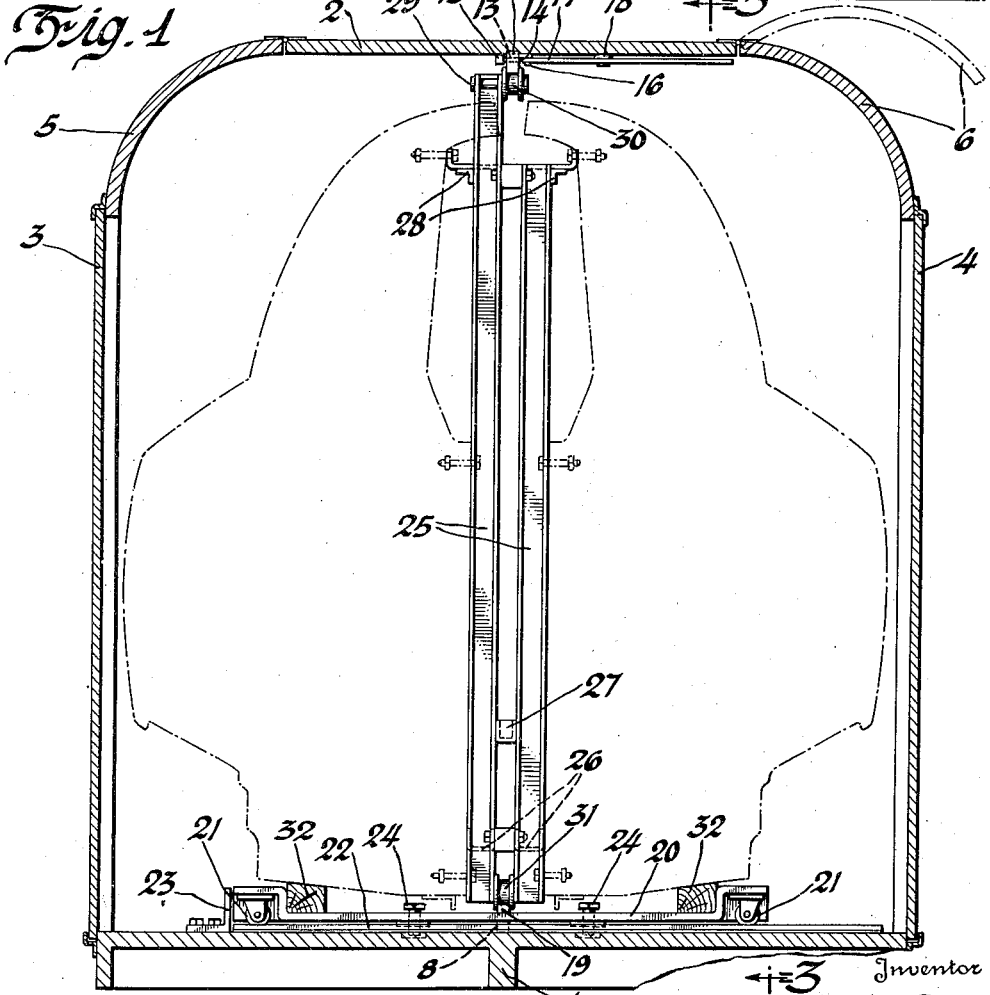
Figure 3:
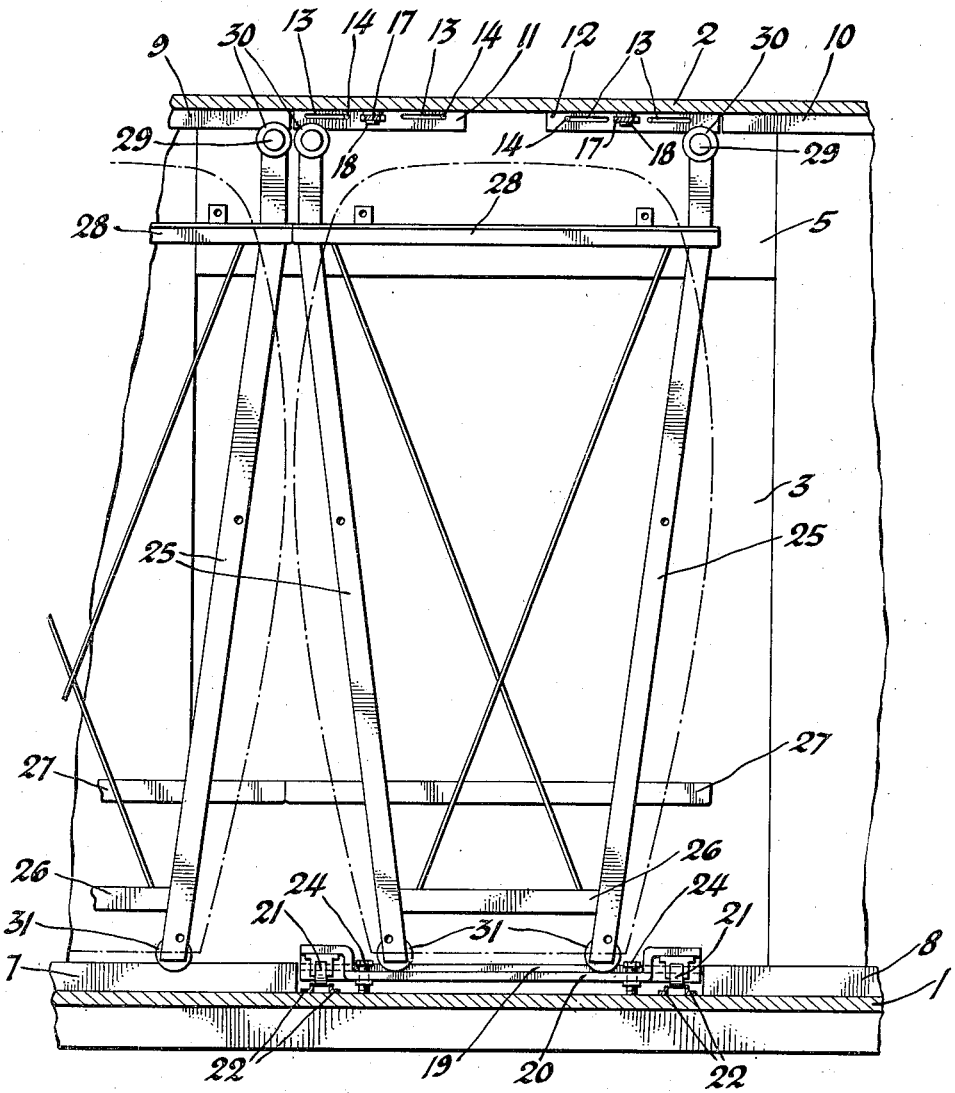

A better understanding of the invention will be had upon reference to the accompanying drawings wherein Figure 1 is a side elevation of a box car, showing in dotted outline the arrangement of loaded bodies within the storage space; Figure 2 is a transverse section at the central loading station of the vehicle and Figure 3 is a longitudinal section taken on the line 3—3 of Figure 2.

In addition to the usual side and end walls the carrier includes a floor 1 and a roof 2. Midway between opposite ends, the side walls are provided with loading openings to be closed by sliding doors 3 and 4. For improved appearance the upper corners between the side walls and the roof comprise curved panels and in line with the door openings the panels include the hinged sections 5 and 6 which may be swung to the dotted line position shown in Figure 2 to increase the height of the loading entrance.

Storage space for articles to be shipped is located on each side of the loading entrance and in this instance both loading spaces are provided with a pair of vertically spaced guide rails or tracks which support and locate removable frames on which are mounted beforehand, the automobile bodies or other articles to be shipped. The bottom guide tracks include the rail sections 7 and 8 permanently or fixedly mounted on the floor 1 on the longitudinal center line of the carrier and extended from the loading entrance to opposite ends of the car. Cooperating top rail sections 9 and 10 are fastened to the roof 2 and also extend along the longitudinal center line of the carrier from the door opening to the opposite end walls.

Between the adjacent ends of the fixed top rails 9 and 10 are a pair of adjustable rail sections 11 and 12 each having a pair of elongated slots 13 through which extend the mounting pins 14 carried by suitable brackets 15 and which allow the adjustable top rail sections 11 and 12 to be shifted as will be more particularly referred to later. For effecting the adjustment of the rail sections 11 and 12 each is provided at one side with a dependent pin 16 received within the forked end of a cooperating lever 17 which extends laterally therefrom and is pivotally mounted as at 18 to the roof 2 with its opposite end terminating in a handle easily accessible from the side of the carrier for manipulation.

Between the adjacent ends of the floor rail sections 7 and 8 and constituting a continuation thereof, is a track section 19 and this is mounted on a transfer dolly adapted for movement laterally into and out of the carrier. The dolly may comprise a metal plate 20 having raised seats at each of its four corners for the rollers or casters 21 by which the dolly may be rolled during the loading and unloading operations. For guiding the casters the floor may carry transversely extending tracks which for convenience may consist of a pair of spaced angle irons as shown at 22.

An angle bracket 23 forming an abutment or stop for the dolly can be mounted on the floor of the carrier on either side thereof depending upon which of the entrance doors is opened for loading or unloading. This stop 23 provides for the longitudinal alinement of the track section 19 on the movable dolly with the permanently located tracks 7 and 8. To effect vertical alinement suitable elevating or jacking means may be provided and for the sake of simplicity it is proposed to screw-threadedly mount in the plate 20 a set of screw studs 24 which through their adjustment and engagement with the floor raise the dolly to the proper height for the alinement of the track sections.

The several load carrying frames which engage the tracks may each comprise two pairs of vertical members 25 of channel section, connected by suitable cross members 26, 27 and 28. One pair of the vertical channels may be slightly longer than the other pair and the longer pair extend to adjacent the roof 2 and carry on pivot pins 29, the double flanged rollers 30 for engagement with the top track. The upper rollers 30 carry no weight and their primary purpose is to sustain the load carrying frame in the vertical position. The gravity load is taken wholly by the lower rail and is transmitted from the several vertical frame members 25 through a pair of double flanged rollers 31 mounted between cooperating channels at each side of the frame.

The articles to be shipped, as in the case of automobile bodies, are bolted or otherwise secured, either directly or indirectly, to the vertical frame members 25. In the case of automobile bodies the bodies are arranged on end and secured back to back to the removable frame. The horizontal cross members 27 and 28 are arranged to project beyond the side members as seen in Figure 3 and are slightly wider than the body supported by the frame for engagement with the ends of corresponding cross members of succeeding frames to locate the parts and keep the bodies out of contact with each other during shipment.

In use a loaded frame is placed at the shipping dock upon the transfer dolly and is blocked against tipping by tapered wooden wedges 32. The loaded dolly is then pushed into the entrance space and the track 19 alined with the fixed tracks 7 and 8. At this time the adjustable top rail sections 11 and 12 are both retracted to provide clearance for the upper rollers 30. For transferring the loaded frame from the dolly one or both of the sections 11 and 12 can be moved into engagement with the top rollers 30 and upon knocking out the wedges 32 the loaded frame can be pushed onto the permanent rails to ride into proper position within the loading space. After both loading spaces are filled the last supporting frame is left on the dolly in the central loading space with both track sections 11 and 12 shifted into engagement with the upper rollers 30. The reverse procedure is followed in unloading the carrier.

In practice it is proposed to mount the bodies on the load supporting frames and have these in readiness when the carrier is brought to the loading dock. The loading would then be effected quickly and the carrier needs to be at the loading dock for only a short interval so that the carrier will be almost constantly in transit between loading and unloading docks. Shipping the bodies on end and back to back enables the most advantageous use of the space available and keeps the over all width of the carrier within practical and legal limits. The matter of transverse dimension of the carrier is particularly important in the case of vehicles which operate on the highway.

I claim:

1. To facilitate the handling and storing of articles to be shipped, a transporting carrier having a pair of permanently located guide rails in vertically spaced cooperative relation, a loading dolly having a guide rail adapted to be brought into alined relation to the lowermost guide rail of the carrier, and a vertically disposed load carrying frame having guide rail engaging means near the top and bottom thereof and being adapted for mounting on the dolly for subsequent transfer to the carrier through the agency of said guide rails.

2. For the transportation of freight, a carrier having a pair of vertically spaced guides, a series of removable load supporting members adapted to be located by and movable in said guides for storage in succession in the carrier, and a loading skid for transferring said members in succession into the carrier, said skid having a guide thereon for alined cooperative relation with the first mentioned guides.

3. In the shipment of freight, a carrier having vertically spaced guide rails, a removable load supporting frame slidably engageable with said rails in a vertical plane and adapted to support on both sides thereof articles to be shipped, a transfer dolly by means of which said frame may be moved into or out of the carrier and guide means on the dolly to engage the frame and for cooperation with the guide rails in the transfer of the frame.

4. In the transportation of freight, a carrier having a loading entrance and a storage space beyond the entrance, top and bottom tracks extending longitudinally in the storage space from the loading entrance, a transfer dolly adapted to be berthed within the loading entrance and provided with a track in continuation of said bottom track, and a vertical frame adapted to carry on opposite sides thereof articles to be shipped, and provided with track engaging means for the transfer of the frame between the tracks of the dolly and carrier.

5. In the transportation of freight, a carrier having a loading entrance and a storage space beyond the entrance, top and bottom tracks extending longitudinally in the storage space from the loading entrance, a transfer dolly adapted to be berthed within the loading entrance and provided with a track in continuation of said bottom track, a series of removable frames loaded in succession in end to end relation in a common vertical plane within the storage space, means mounting articles to be shipped on opposite sides of the frames, and guide means at the top and bottom of each frame to ride said tracks in the transfer of the frames between the carrier and said dolly.

6. In the transportation of freight, a series of load carrying frames arranged end to end in succession in a longitudinal vertical plane, a carrier to enclose said frames, cooperating top and bottom frame guide sections stationarily mounted in the carrier, a loading dolly laterally removable from the carrier, a frame guide section mounted on the dolly and adapted for alinement with the stationary bottom guide section, and a frame guide section adjustably mounted in the carrier in continuation of the stationary top guide section and movable in relation to said stationary top guide section to provide clearance for the frame in the lateral movement of the dolly.

7. In the transportation of freight, a series of load carrying frames arranged end to end in succession in a longitudinal vertical plane, a carrier to enclose said frames, cooperating top and bottom frame guide sections stationarily mounted in the carrier, a loading dolly laterally removable from the carrier, a frame guide section mounted on the dolly and adjustable means for effecting alined relation between the dolly mounted frame guide section and the stationary bottom frame guide section.

8. Means for shipping automobile bodies comprising, in combination with a closed transporting vehicle, guide means mounted at the longitudinal median line of the vehicle floor and at the longitudinal median line of the vehicle ceiling, body holding frames provided with end members adapted to engage the guide means on the floor and the guide means on the vehicle ceiling, said frames being adapted to be moved successively into engagement with the guide means and thereby hold the automobile bodies in vertical position; and means whereby a pair of the bodies may be mounted back to back on each frame in parallel relation on opposite sides of the longitudinal median line of the vehicle.

9. In means of the character described, the combination of a closed railroad car provided with door openings; means disposed lengthwise of the car floor and lengthwise of the car ceiling substantially in the same vertical plane; and an automobile body holding frame adapted to be disposed vertically in engagement with said means and to hold a pair of automobile bodies on end and in back to back relation on opposite sides of the frame; said means being adapted to guide the movement of the vertically disposed frame lengthwise of the car.

NEIL M. LONEY.